United States Patent Office 3,104,119
Patented Sept. 17, 1963

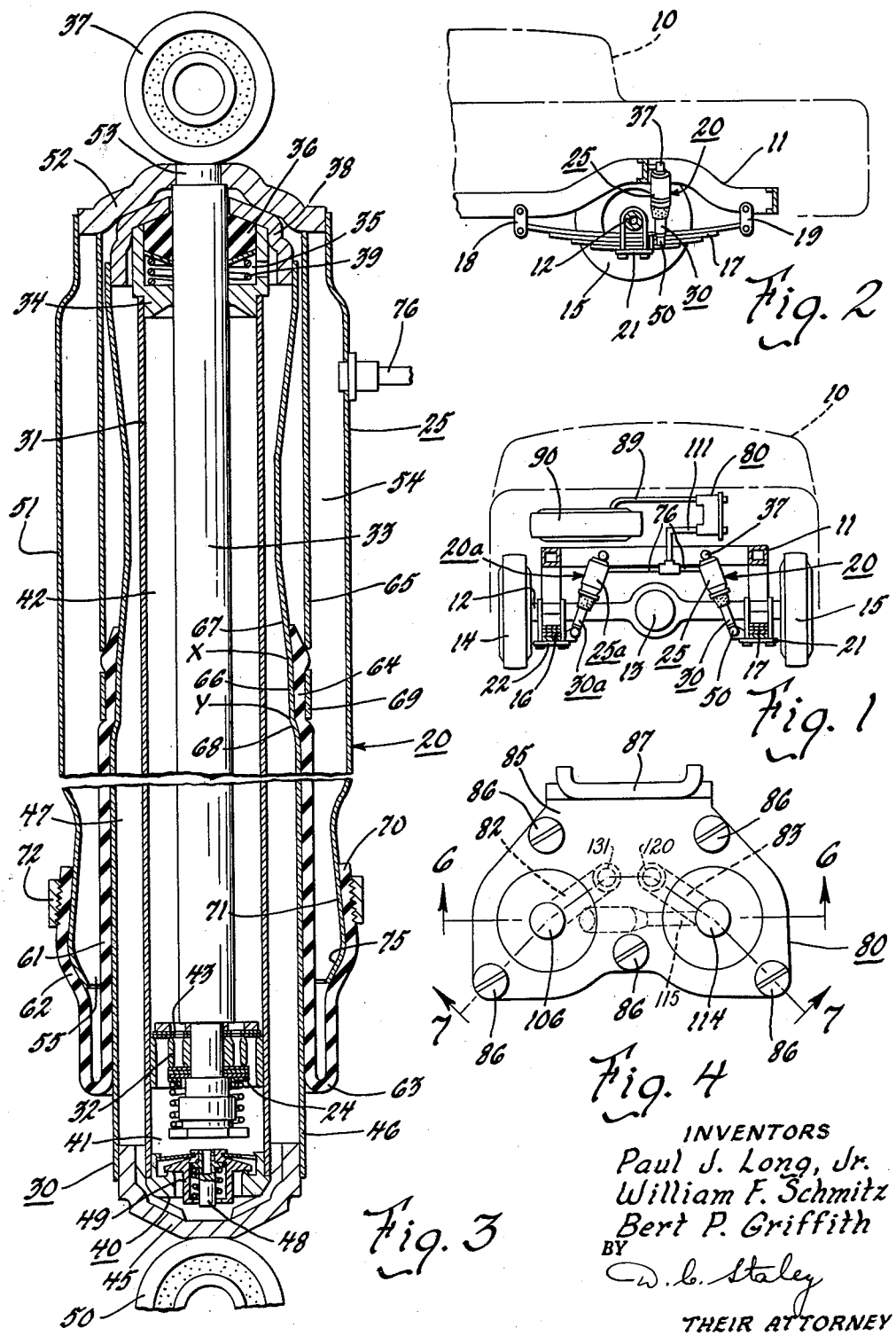

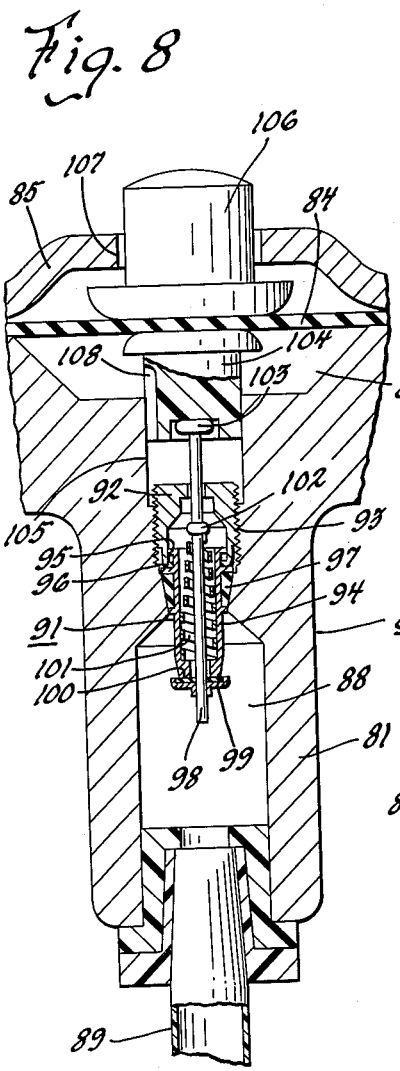
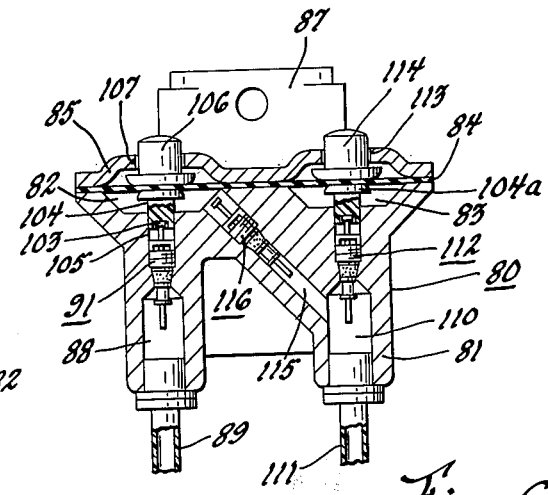
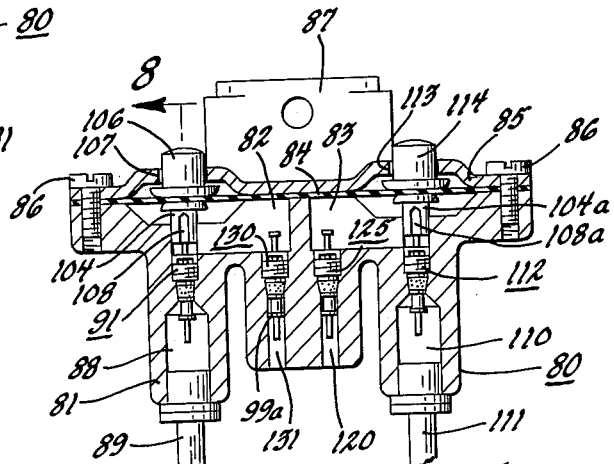
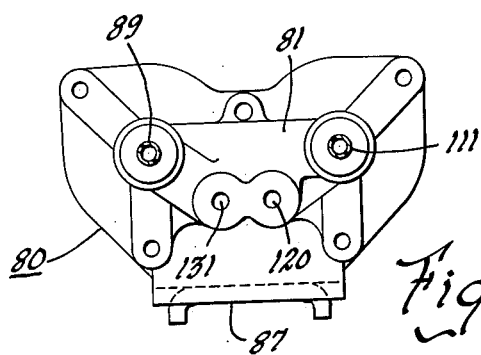

3,104,119
VEHICLE SUSPENSION SYSTEM
Paul J. Long, Jr., William F. Schmitz, and Bert P. Griffith, Dayton, Ohio, assignors to General Motors Corporation, Detroit, Mich., a corporation of Delaware
Filed Sept. 12, 1960, Ser. No. 55,360
5 Claims. (Cl. 280—124)

This invention relates to an automotive vehicle suspension system incorporating a combination shock absorber and supplementary air spring unit assembly that is adapted to be placed between the sprung mass and the unsprung mass of a vehicle adjacent the main suspension spring for the vehicle that is also placed between the sprung mass and the unsprung mass of the vehicle with the combination shock absorber and supplementary air spring unit assembly being disposed in the same position normally occupied by a conventional direct-acting tubular type shock absorber so that when the supplementary air spring unit is pressurized with a suitable fluid under pressure, such as air, the supplementary air spring unit will aid the main suspension spring in support of the sprung mass of the vehicle on the unsprung mass.

The main suspension springs for the vehicle are engineered to provide the desired suspension normally provided between the sprung mass and the unsprung mass of a vehicle, the main suspension springs being engineered to give the ride effect desired in the vehicle. Normally a direct-acting tubular type shock absorber is positioned between the sprung mass and the unsprung mass of the vehicle adjacent the main suspension spring to damp movements between the sprung mass and the unsprung mass of the vehicle.

In this invention a direct-acting tubular type shock absorber is provided with a supplementary air spring unit which forms with the shock absorber an assembly that is adapted to be placed between the sprung mass and the unsprung mass of the vehicle in the same position normally occupied by the conventional direct-acting tubular type shock absorber. The supplementary air spring unit is adapted to be operated either in a deflated condition or in an inflated condition depending upon whether or not supplementary or aiding support is required between the sprung mass and the unsprung mass of the vehicle to maintain the vehicle in a level condition relative to the road, depending upon the load carried in the vehicle.

Under all normal operating conditions the vehicle is designed to carry an average load condition of passengers and baggage, but even under these conditions there are times when the passenger load and the baggage load become heavy so that the rear end of the vehicle tends to sag. Under these conditions, or under extra heavily loaded conditions, such as when a boat or house trailer is being drawn by the vehicle, the supplementary air spring, that is around the shock absorber can be pressurized with a suitable fluid under pressure, such as air, to provide an air spring unit that will yieldingly support or help support the added load and thereby aid the main suspension spring in the yielding support of the sprung mass on the unsprung mass of the vehicle.

Under conditions of operation of the vehicle wherein the supplementary air spring unit is not required to give any substantial aid to the main suspension spring of the vehicle, the supplementary air spring unit will operate in a deflated condition so that the flexible walls of which it is constructed tend to abrade one another in their movement of reciprocation with the reciprocal movement of the telescoping parts of the shock absorber. To conserve space, at least a part of the wall structure of the air spring unit is formed as a flexible tubular wall structure comprising inner and outer wall portions interconnected by a return bend portion, the inner and outer wall portions of the tubular wall section of the supplementary air spring unit tending to ride upon one another in the telescoping movement or reciprocating movement of the shock absorber parts. This abrading action between the flexible walls of the tubular wall portion of the air spring unit tends to reduce the life of the wall structure. Also, the wall portion is caused to bend over a much sharper radius in the return bend portion than when the air spring unit is being operated in an inflated condition, which reduces life of the wall structure.

In a combination shock absorber and supplementary air spring unit, it is desirable to therefore control the minimum pressure value to which the air spring portion of the assembly will be deflated at any time. Also, to prevent overinflation of the air spring unit, since manual inflation and deflation is being used to apply air to the air spring unit or exhaust air therefrom, it is desirable that a suitable control be provided to prevent the air pressure applied to the air spring unit from exceeding a predetermined maximum high pressure irrespective of the high pressure of the source pressure that could be applied to the air spring unit. Obviously, if an excessively high source pressure is used as the source of pressure for the air spring unit and the manual control retains the inlet control valve open for too great a length of time, the air spring could be overinflated with resulting bursting.

It is therefore an object of this invention to provide a control means in an automotive vehicle suspension system that incorporates a combination shock absorber and supplementary air spring unit in the suspension system that is capable of being manually operated to control supply of air pressure or other suitable gas pressure to the fluid spring or air spring unit to inflate the unit to desirable conditions as required by the operator of the vehicle, and also to manually deflate the air spring when the operator of the vehicle so desires, but which control means incorporates automatically operating valves which prevent overinflation of the air spring unit during inflation of the air spring and which will also prevent the air spring from being deflated or exhausted below a predetermined minimum pressure, the high pressure control being in the form of a pressure relief valve and the low pressure control being in the form of a residual pressure control valve.

It is another object of the invention to provide a control valve arrangement for accomplishing the features of the foregoing object wherein both the manually operated and the automatically operated valves are incorporated in a single valve body with suitable passages for interflow of fluid to provide for inflation and deflation of the air spring and for entrapment of air pressure in the air spring after inflation, but which entrapment can be eliminated when the exhaust valve is open to deflate the air spring.

Further objects and advantages of the present invention will be apparent from the following description, reference being had to the accompanying drawings wherein preferred embodiments of the present invention are clearly shown.

In the drawings:

FIGURE 1 is a schematic elevational view of an automotive vehicle incorporating features of this invention.

FIGURE 2 is a schematic elevational view taken longitudinally of the vehicle illustrating the suspension system that incorporates features of this invention.

FIGURE 3 is a longitudinal cross-sectional view of a combination shock absorber and air spring unit that is incorporated in the vehicle suspension system illustrated in FIGURES 1 and 2.

FIGURE 4 is a plan view of a control valve incorporating features of this invention used to control inflation and deflation of the air spring unit of the device of FIGURE 3.

FIGURE 5 is a bottom view of the valve structure illustrated in FIGURE 4.

FIGURE 6 is a cross-sectional view taken along line 6—6 of FIGURE 4.

FIGURE 7 is a cross-sectional view taken along line 7—7 of FIGURE 4.

FIGURE 8 is an enlarged cross-sectional view of one of the valve elements of the valve structure.

In this invention, in FIGURES 1 and 2, there is illustrated schematically an automotive vehicle suspension system incorporating features of this invention. The motor vehicle 10 has a chassis frame 11 that forms the sprung mass of the vehicle, together with the body of the vehicle, that is supported on the axle structure 12 having the differential 13 and the wheels 14 and 15 that are laterally spaced on the axle, the axle structure and the wheels forming the unsprung mass of the vehicle. The main suspension springs 16 and 17 are attached to the axle 12 in conventional manner with the ends of the springs 16 and 17 each being connected with the chassis frame 11 by means of support shackles 18 and 19 placed at opposite ends of the leaf springs 16 and 17.

A combination shock absorber and supplementary air spring unit 20 is placed between the attachment support 21 for the spring 17 and the chassis 11, the combination shock absorber and air spring unit being disposed adjacent the main suspension spring 17 and being adapted to operate in parallel support relation effort to resiliently support the chassis 11 on the axle structure of the vehicle. A similar combination shock absorber and air spring unit 20a is located between the support bracket 22 for the spring 16 and the chassis 11 in the same manner as the unit 20. When the air spring units 25 and 25a are inflated in a manner hereinafter described, the air spring units aid support of the sprung mass or chassis 11 on the unsprung mass or axle structure 12 to prevent rear end sagging of the vehicle, the shock absorber of each of the combination units 20 and 20a functioning as a conventional direct-acting tubular type shock absorber.

The combination direct-acting tubular type shock absorber and air spring unit assembly is more particularly illustrated in FIGURE 3, each of the units 20 and 20a being of like structure, as shown in FIGURE 3.

As illustrated in FIGURE 3, the combination shock absorber and air spring unit assembly consists of a shock absorber 30 and the air spring unit 25 that is carried on the shock absorber. The shock absorber consists of a pressure cylinder 31 having a valved piston 32 that is carried on the end of a reciprocating rod 33. The reciprocating rod 33 extends through a rod guide member 34 at one end of the pressure cylinder 31, the rod guide member 34 having a rod seal chamber 35 that receives a rod seal 36 engaging the rod 33 and sealing against loss of hydraulic fluid from within the pressure cylinder 31. The projecting end of the rod 33 carries a fitting 37 that is adapted to be attached to the sprung mass or chassis 11 of the vehicle for attaching this end of the shock absorber to the vehicle. The seal chamber 35 is closed by a cap member 38 that also holds the rod seal 36 within the chamber 35, a compression spring 39 retaining resilient pressure on the seal member 36 to retain it in sealing engagement with the surface of the reciprocal rod 33.

The lower end of the pressure cylinder 31 is closed by a base valve structure 40 so that a compression chamber 41 is formed between the base valve 40 and the piston 32. A rebound chamber 42 is formed between the piston 32 and the rod guide 34 at the upper end of the pressure cylinder 31.

The piston 32 is provided with a compression control valve 43 on one side of the piston to regulate flow of hydraulic fluid from the chamber 41 into the chamber 42 on movement of the piston 32 toward the base valve 40, excess fluid produced by the entry of rod 33 into the chamber 42 being displaced through the base valve 40 into the reservoir chamber around the pressure cylinder 31. On the opposite side of the piston 32 there is provided the rebound control valve 24 that regulates flow of hydraulic fluid from chamber 42 into chamber 41 when the piston moves upwardly away from the base valve 40, additional fluid for filling the chamber 41 being obtained from the reservoir through the base valve 40.

The base valve 40 is carried in a closure cap 45 that is secured within one end of a reservoir tube 46 surrounding and spaced from the pressure cylinder tube 31. The upper end of the reservoir tube 46 is fixedly attached to the closure cap 38, thereby providing a closed fluid reservoir space 47 between the pressure cylinder tube 31 and the reservoir tube 46.

The base valve 40 has a valve member 48 that controls flow of hydraulic fluid from the compression chamber 41 into the reservoir chamber 47 on movement of the piston 32 toward the base valve 40. The base valve also includes a valve member 49 that provides for relatively free flow of hydraulic fluid from the reservoir chamber 47 back into the compression chamber 41 on movement of the piston 32 away from the base valve.

The closure cap 45 carries a fitting 50 that is adapted to attach the lower end of the shock absorber to the unsprung mass or axle structure 12 of the vehicle, the fitting members 50 and 37 thereby attaching the combination shock absorber and air spring unit assembly 20 and 20a between the sprung mass and the unsprung mass of the vehicle, in which condition the shock absorber 30 can function in conventional manner to provide for damping of relative movement between the sprung mass and the unsprung mass of the vehicle.

The air spring unit assembly 25 of the combination structure includes a tubular wall 51 that surrounds the reservoir tube 46 and is spaced from the tube and is coaxial with the axis of the shock absorber. The upper end of this tubular member 51 is secured to a cap member 52 that, in turn, is secured to the upper end 53 of the rod 33, the cap 52 and the tubular member 51 forming a chamber space 54 having an open end 55.

The open end 55 of the chamber space 54 is closed by a double-walled flexible tubular structure that includes an inner wall portion 61 and an outer wall portion 62 connected together by a return bend portion 63 integral with the wall portions 61 and 62, and is formed by these portions on relative reciprocation between the inner and the outer wall portions 61 and 62.

The inner wall portion 61 is sleeved onto the reservoir tube 46 and has a free end portion 64 that is attached to the reservoir tube 46 frictionally by an attaching sleeve 65.

The reservoir tube 46 has a cylindrical wall portion 66 coaxial with the axis of the shock absorber from the upper end of which there extends a wall portion 67 that has a diameter that diminishes continuously as the wall portion extends upwardly from the line X, the wall portion 67 being in the form of a truncated cone the base of which joins with the cylindrical wall portion at the line X. The wall portion 66 has a wall portion 68 extending downwardly therefrom that is of a diameter that increases continuously from the line Y to form a shoulder by the wall portion 68. The cylindrical sleeve 65 has the band portion 69 that extends coaxial with the wall portion 66 to retain the free end 64 of the inner wall 61 frictionally in engagement with the reservoir tube 46, the shoulder 68 preventing the sleeve 65 and the wall 61 from moving downwardly toward the base end of the shock absorber when fluid under pressure, such as air, is applied within the chamber space 54. The sleeve 65 extends substanially into engagement with the cap 52, as shown in FIGURE 3.

The outer wall portion of the flexible tubular wall structure has the free end 70 thereof attached to the lower end portion 71 of the tubular member 51 by a nonexpansible metal ring 72 which frictionally retains the free end portion 70 in friction engagement with the wall portion 71. The wall portion 71 is in the form of a truncated cone so that fluid under pressure applied within the chamber space 54 tending to urge the outer wall portion 62 downwardly will tighten the friction engagement of the end wall portion 70 with the wall portion 71.

The lower end of the wall portion 71 has an inwardly turned wall portion 75 that has its terminus end in close proximity to the inner wall 61 of the flexible tubular wall structure when the shock absorber is in complete collapsed position as shown in FIGURE 3 so that when the wall member 51 reciprocates relative to the reservoir tube 46, on reciprocation of the rod 33, the outer wall portion 62 will not tend to turn inwardly into the chamber space 54 and thereby become bound between the lower end of the tubular member 51 and the inner wall 61 or the guide wall 65 that is provided at the upper end of the shock absorber. A conduit connection 76 is provided in the tubular wall 51 through which fluid under pressure is supplied into chamber space 54 and through which pressure fluid is exhausted from the chamber space 54 under control of suitable valving hereinafter described.

From the foregoing description it will be apparent that the shock absorber 30 of the combination shock absorber and air spring unit can function in conventional manner as a shock absorber when the air spring unit is deflated, or depressurized, and when the air spring unit receives fluid under pressure, such as air, the air spring unit will aid the main springs 16 and 17 in resilient support of the sprung mas on the unsprung mass of the vehicle, the shock absorber still retaining its normal function.

In FIGURES 4 to 8 inclusive there is illustrated a controlled valve means that is adapted to be manually operated for supply of fluid under pressure into the chamber space 54 of the combination shock absorber and air spring unit, the valve mechanism including means to prevent air pressure from exceeding a predetermined high pressure value in the chamber space 54 to prevent damage to the flexible wall of the air spring unit by overinflation. Also, the control valve means includes manually operated valve means to effect exhaust of fluid pressure from the chamber space 54 when the air spring unit is to be deflated, the valve including a residual pressure control valve that prevents fluid pressure in the air springs from falling below a minimum pressure during exhausting of the air spring.

The control valve mechanism 80 consists of a valve body 81 having two separate fluid receiving chambers 82 and 83 that are closed on one side by a diaphragm 84 held on the body 81 by a cover plate 85 secured in position by the cap screws 86. The valve body 81 has a mounting plate 87. The chamber 82 in the valve body 81 has an inlet port 88 with which a fluid pressure supply line 89 communicates by insertion of end of the line in the port 88. The conduit 89 is adapted to be connected with any suitable source of fluid or air under pressure, such as the spare tire 90 normally retained in the trunk of a vehicle. Other suitable source of pressure such as a fluid-filled container or pressure bottle can be used as the fluid pressure source for supplying fluid under pressure to the air springs 25 and 25a.

The port 88 for the chamber 82 receives a manually operated control valve 91 that is in the form of a conventional tire valve, the valve 91 being more particularly illustrated in FIGURE 8.

The valve 91 consists of an externally threaded body 92 received in the threaded portion 93 of the port 88. The body 92 carries a sleeve 94 by means of the interconnecting flanges 95 and 96. The sleeve 94 carries a rubber seal 97 that seats in a suitable seat opening provided in the port 88, as urged thereinto by the threaded body 92.

A valve stem 98 carries a valve element 99 on the lower end thereof that is retained on its seat 100 by a compression spring 101 positioned within the sleeve 94 and engaging the enlargement 102 on the stem 98.

The upper end of the valve stem 98 carries a head enlargement 103 engaged by a button 104 that slides in the opening 105. The button 104 is urged downwardly against stem 98 to open valve element 99 from its seat 100 by the manually operated button 106 positioned on the opposite side of the diaphragm 84 and extending through the cover plate 85 through the opening 107 provided for the same. The button 104 may have fluid passages 108 that allow fluid flow from the valve 91 into the chamber 82 in the valve body when the valve element 99 is off its seat 100.

The valve body 81 has a second inlet port 110 to which there is connected the conduit means 111 which, in turn, is connected with the conduit 76 for supplying fluid under pressure to the air springs 25 and 25a and for exhausting fluid pressure from the air springs. The conduit 110 communicates with the chamber 83 under control of the manually operated valve 112 that is of exactly the same type as valve 91, both valves 91 and 112 normally being closed, as shown in the drawing.

Valve 112 has the button 104a to operate the same that is manually actuated by the manually operated button 114 that extends through the closure member 85 through the opening 113.

The chamber 82 in the valve body 81 is in fluid connection with the inlet port 110 by means of the fluid flow passage 115 in which there is placed the unidirectional flow check valve 116 that is also of the same type as valve 91 so that when fluid under pressure is established in chamber 82, the valve 116 will allow the fluid pressure to flow through the passage 115 into the port 110 and thence into the conduit 111 for supply of fluid under pressure to the air springs 25 and 25a.

From the description thus far, it will be apparent that when fluid under pressure is to be supplied to the chamber space 54 of the air springs 25 and 25a that manual operation of the button 106 in a downward direction, as viewed in FIGURE 6, will open valve 91 to allow fluid under pressure to flow from the conduit 89 into chamber space 82 and thence through the valve 116 into chamber 110 and into conduit 111 for supply of air under pressure to the air springs. When the valve member 91 is closed, it will be apparent that the check valve 116 will prevent any flow of fluid from the port 110 into the chamber 82, and thereby establish an entrapment of the fluid pressure in the air spring in cooperation with the valve 112, which is closed at this time. The use of the check valve 116 is desirable to prevent back flow of fluid pressure from the air spring through valve 91 in the event the pressure fluid in the conduit 89 should for some reason become lower than the fluid pressure in the air spring.

When the air springs 25 and 25a are to be depressurized, the button 114 is manually operated to open valve 112 and thereby allow exhaust of fluid pressure from the air springs freely to the exterior of the valve body through the exhaust port 120 that communicates with the chamber 83.

A residual pressure control valve 125 is positioned in the port 120 and is a unidirectional flow valve member which allows exhaust of fluid pressure from the chamber 83 through the port 120. The valve 125 is like valve member 91 heretofore described, the compression spring which retains the valve stem in closed position normally having a spring force which is adapted to close the valve 125 when the fluid pressure in chamber 83 reaches a predetermined minimum value during the exhausting of fluid pressure from the air springs. That is, so long as the fluid pressure in the air springs, and thus in chamber 83, is above a predetermined minimum value, and valve 112 is open, fluid pressure will exhaust from the air spring through the valve 125. However, when the fluid pressure falls off to the predetermined value established for closing of the valve 125, the valve will close and thereby prevent further exhaust of fluid pressure from the air springs, irrespective of whether or not valve 112 is retained open. Obviously, when the valve 112 is allowed to close, after exhausting of the air springs, the residual pressure control valve 125 establishing the minimum pressure value in the air springs, valve 112 will then entrap the minimum pressure value in the air springs, since valve 112 is normally closed.

To prevent excessively high pressures being introduced into the air springs 25 and 25a when they are being pressurized with valve 91 open, and subject to a high pressure from the pressure source, a high pressure relief valve 130 is provided in the relief port 131. This valve 130 has the spring thereof of a spring force sufficient to hold the valve element 99a closed until a predetermined high pressure value is reached in chamber 82, after which valve 130 will open and remain open so long as the pressure in chamber 82 is equal to the predetermined high pressure established as that which should be maximum allowable in the chamber space 54 of the air springs.

If valves 116 and 130 are not used, for any reason, such as to reduce cost, valve 91 will have the spring pressure valued at a sufficiently high level that under normal pressure increase in the air spring resulting from relative movement between the sprung and the unsprung mass of the vehicle air will not discharge through the valve 91 back into the inlet line 89, but even if some air should leak through valve 91 under this condition of operation, the air will still be captive within the tire 90 so that it could be used to reinflate the air spring.

The control valve is thus adapted to be manually operated for supply of fluid under pressure to the air springs and for exhaust of fluid pressure from the air springs but with the supply of fluid pressure to the air springs being under control of an automatically operating high pressure relief valve that will prevent overinflation of the air springs, and with exhaust of fluid pressure from the air springs being under automatic control of a residual pressure control valve that retains a minimum pressure value in the air spring during the exhausting of the air spring.

While the embodiments of the present invention, as herein disclosed, constitute preferred forms, it is to be understood that other forms might be adopted.

What is claimed is as follows:

1. In an automotive vehicle suspension system, the combination including a sprung assembly and an unsprung assembly, said unsprung assembly comprising an axle and a ground engaging wheel mounted on said axle, a main suspension spring adjacent said wheel and connected with said sprung and unsprung assemblies to yieldably support the sprung assembly on the unsprung assembly, a hydraulic direct-acting tubular shock absorber having relatively reciprocating telescoping parts positioned adjacent said main suspension spring with one of said parts connected to said sprung assembly and the other of said parts connected to said unsprung assembly adjacent the main suspension spring, said shock absorber including a generally tubularly arranged wall structure disposed coaxially around the shock absorber in spaced relation thereto of which at least a part of which structure is a flexible resilient tubular member one end of which is attached to one of said parts of said shock absorber and the other end of which is connected with the other of said parts of said shock absorber and cooperating therewith to form a fluid pressure receiving chamber of an air spring unit formed thereby the said wall structure of which reciprocates with the relative reciprocation of the said parts of said shock absorber, remotely positioned manually operated fluid pressure flow control means providing for either supply of fluid pressure to said air spring or exhaust of fluid pressure from said air spring under manual control, other automatic control valve means actuated by increase in fluid pressure in said air spring automatically limiting maximum fluid pressure applied to said air spring during manually controlled supply of fluid pressure to said air spring, and still additional control valve means actuated by decrease in fluid pressure in said air spring automatically controlling minimum fluid pressure retained in said air spring during manually controlled exhaust of fluid pressure from said air spring.

2. In an automotive vehicle suspension system, the combination including a sprung assembly and an unsprung assembly, said unsprung assembly comprising an axle and a ground engaging wheel mounted on said axle, a main suspension spring adjacent said wheel and connected with said sprung and unsprung assemblies to yieldably support the sprung assembly on the unsprung assembly, a hydraulic direct-acting tubular shock absorber having relatively reciprocating telescoping parts positioned adjacent said main suspension spring with one of said parts connected to said sprung assembly and the other of said parts connected to said unsprung assembly adjacent the main suspension spring, said shock absorber including a generally tubularly arranged wall structure disposed coaxially around the shock absorber in spaced relation thereto of which at least a part of which structure is a flexible resilient tubular member one end of which is attached to one of said parts of said shock absorber and the other end of which is connected with the other of said parts of said shock absorber and cooperating therewith to form a fluid pressure receiving chamber of an air spring unit formed thereby the said wall structure of which reciprocates with the relative reciprocation of the said parts of said shock absorber, a first remotely positioned manually controlled fluid pressure flow control valve means providing for supply of fluid pressure to said air spring, a second remotely positioned manually controlled fluid pressure flow control valve means providing for exhaust of fluid pressure from said air spring, other control valve means actuated by increase in fluid pressure in said air spring automatically limiting maximum fluid pressure applied to said air spring during manually controlled supply of fluid pressure to said air spring by said first control valve means, and still additional control valve means actuated by decrease in fluid pressure in said air spring automatically limiting minimum fluid pressure retained in said air spring during manually controlled exhaust of fluid pressure from said air spring by said second control valve means.

3. In an automotive vehicle suspension system, the combination including a sprung assembly and an unsprung assembly, said unsprung assembly comprising an axle and a pair of laterally spaced ground engaging wheels mounted on said axle, a main suspension spring adjacent each of said wheels and connected with said sprung and unsprung assemblies to yieldably support the sprung assembly on the unsprung assembly, an auxiliary air spring unit positioned adjacent each of said main suspension springs and connected between said sprung and unsprung assemblies to yieldably aid the said main springs in support of the sprung assembly on the unsprung assembly in parallel support relation effort with the said main suspension springs, a remotely positioned first manually controlled fluid pressure flow control valve means providing for supply of fluid pressure to said air springs concurrently, a remotely positioned second manually controlled fluid pressure flow control valve means providing for exhaust of fluid pressure from said air springs concurrently, other control valve means actuated by increase in fluid pressure in said air springs automatically limiting maximum fluid pressure applied to said air springs during manually controlled supply of fluid pressure to said air springs by said first control valve means, and still additional control valve means actuated by decrease in fluid pressure in said air springs automatically limiting minimum fluid pressure retained in said air springs during manually controlled exhaust of fluid pressure from said air springs by said second control valve means.

4. An automotive vehicle suspension system constructed and arranged in accordance with the structure set forth in claim 3 in which said other control valve means comprises a high pressure relief valve which opens at a predetermined high pressure and said additional control valve means comprises a residual pressure check valve means which closes at a predetermined minimum pressure.

5. An automotive vehicle suspension system constructed and arranged in accordance with the structure set forth in claim 1 in which said other control valve means comprises a high pressure relief valve which remains open beyond a predetermined high pressure and said additional control valve means comprises a residual pressure check valve which closes at a predetermined minimum pressure and thereafter remains closed.

References Cited in the file of this patent

UNITED STATES PATENTS

| | | |
|---|---|---|
| 2,887,324 | Jackson | May 19, 1959 |
| 2,923,557 | Schilling | Feb. 2, 1960 |
| 2,942,623 | Schwartz | June 28, 1960 |
| 2,967,547 | Pribonic | Jan. 10, 1961 |
| 2,969,975 | Chuba | Jan. 31, 1961 |
| 2,984,475 | Gregoire | May 16, 1961 |

FOREIGN PATENTS

| | | |
|---|---|---|
| 202,613 | Australia | July 25, 1956 |
| 214,922 | Australia | May 2, 1958 |